US009926143B2

(12) United States Patent
Yoshikane

(10) Patent No.: US 9,926,143 B2
(45) Date of Patent: Mar. 27, 2018

(54) APPARATUS FOR SUPPLYING SPOUT ATTACHMENT BAGS

(71) Applicant: Toyo Jidoki Co., Ltd., Minato-ku, Tokyo (JP)

(72) Inventor: Tohru Yoshikane, Iwakuni (JP)

(73) Assignee: Toyo Jidoki Co., Ltd., Minato-ku, Tokyo (JP)

( * ) Notice: Subject to any disclaimer, the term of this patent is extended or adjusted under 35 U.S.C. 154(b) by 0 days.

(21) Appl. No.: 15/274,695

(22) Filed: Sep. 23, 2016

(65) Prior Publication Data
US 2017/0088362 A1 Mar. 30, 2017

(30) Foreign Application Priority Data

Sep. 25, 2015 (JP) .................................. 2015-188157

(51) Int. Cl.
| | |
|---|---|
| *B65B 3/02* | (2006.01) |
| *B65G 43/08* | (2006.01) |
| *B65B 51/00* | (2006.01) |
| *B65G 13/04* | (2006.01) |
| *B65G 15/00* | (2006.01) |
| *B65G 21/20* | (2006.01) |
| *B65G 39/07* | (2006.01) |
| *B65G 47/91* | (2006.01) |
| *B65B 43/12* | (2006.01) |

(Continued)

(52) U.S. Cl.
CPC .............. *B65G 43/08* (2013.01); *B65B 43/12* (2013.01); *B65B 51/00* (2013.01); *B65B 61/186* (2013.01); *B65G 13/04* (2013.01); *B65G 15/00* (2013.01); *B65G 21/2072* (2013.01); *B65G 39/07* (2013.01); *B65G 47/914* (2013.01); *B65G 47/915* (2013.01); *B31B 70/04* (2017.08); *B31B 70/844* (2017.08); *B31B 2150/00* (2017.08); *B65D 47/06* (2013.01); *B65G 2201/0238* (2013.01); *B65G 2203/0233* (2013.01)

(58) Field of Classification Search
CPC .. B65B 3/02; B65B 3/04; B65B 43/18; B65B 43/30; B65G 43/08
USPC ............. 53/558; 198/468.4, 461.2, 388, 383, 198/397.06
See application file for complete search history.

(56) References Cited

FOREIGN PATENT DOCUMENTS

| | | |
|---|---|---|
| JP | 08-337217 A | 12/1996 |
| JP | 2004-244085 A | 9/2004 |

(Continued)

*Primary Examiner* — Gene O Crawford
*Assistant Examiner* — Lester III Rushin
(74) *Attorney, Agent, or Firm* — Norton Rose Fulbright US LLP

(57) ABSTRACT

An apparatus for supplying spout attachment bags including a first transfer device for transferring a spout attachment bag in a horizontal orientation, a positioning device for receiving and horizontally positioning the spout attachment bag transferred from the first transfer device, a second transfer device for transferring upward the spout attachment bag positioned by the positioning device and changing the spout attachment bag from the horizontal orientation to a vertical orientation so that the spout attachment opening faces upward and is horizontal, and a detection device. The position of the spout attachment opening on the positioning device is detected by the detection device and is compared to a preset reference position, so that any amount of deviation between the two positions is corrected, thus keeping the height positions of the spout attachment openings of the spout attachment bags changed to a vertical orientation steady.

4 Claims, 11 Drawing Sheets

(51) Int. Cl.
  *B65B 61/18* (2006.01)
  *B65D 47/06* (2006.01)
  *B31B 70/04* (2017.01)
  *B31B 150/00* (2017.01)
  *B31B 70/84* (2017.01)

(56) References Cited

FOREIGN PATENT DOCUMENTS

| | | |
|---|---|---|
| JP | 2010-036913 A | 2/2010 |
| JP | 4566628 B2 | 8/2010 |
| JP | 2015/168459 A | 9/2015 |

APPARATUS FOR SUPPLYING SPOUT ATTACHMENT BAGS

BACKGROUND OF THE INVENTION

1. Field of the Invention

The present invention relates to an apparatus for supplying spout attachment bags, which is used to supply spout attachment bags each having a spout attachment opening formed at a corner thereof (thus can be called, "corner spout attachment bags") to a spout attachment apparatus.

2. Description of the Related Art

Patent Document 1 (Japanese Patent No. 4566628) discloses supply of a spout (corner spout) to a spout attachment opening that is formed at a corner of a spout attachment bag (a bag to which a spout is to be attached) in a spout attachment apparatus. In this case, the bag is tilted (rotated along the bag plane) so that the spout attachment opening faces upward and is horizontal, and then the spout attachment bag is supplied in this state to the spout attachment apparatus.

Meanwhile, the applicant of the present patent application disclosed an apparatus for supplying spout attachment bags in Japanese Patent Application No. 2014-043864 (Japanese Patent Application Laid-Open (Kokai) No. 2015-168459). This supply apparatus supplies spout attachment bags each having a spout attachment opening formed at a corner to a spout attachment apparatus. This supply apparatus comprises a positioning device (6) that positions a spout attachment bag at a specific position in a horizontal orientation so that a spout attachment opening is facing forward, a rotary transfer device (5) that transfers a spout attachment bag to the positioning device (6) in a horizontal orientation in which the spout attachment opening is facing forward, and a transfer device (57) that transfers upward the spout attachment bag positioned by the positioning device and, in the course of this transfer, changes the spout attachment bag from the horizontal orientation to a vertical orientation so that the spout attachment opening faces upward and is horizontal. The reference numerals in parentheses above are the reference numbers of various devices disclosed in the drawings of the Japanese Patent Application No. 2014-043864 (Japanese Patent Application Laid-Open (Kokai) 2015-168459).

The rotary transfer device (5) includes a support shaft that is disposed vertically. This support shaft can be moved up and down and rotated and is further moved reciprocally along the transfer direction of the spout attachment bags. The rotary transfer device (5) further includes a suction member that is installed at a lower end of the support shaft and whose suction face faces downward. The rotational axis of the support shaft is always located in a reference plane (that is set on a single vertical plane); and a spout attachment bag positioned in a horizontal orientation at a specific position is picked up by the suction member, lifted upward, and then transferred while being kept in a horizontal orientation. The spout attachment bag is rotated by a specific angle along the bag plane in the course of (or during) this transfer. The spout attachment bag, at a specific position, is positioned so that the center line of the bag (a straight line that passes through the center in the width direction of the bag) is positioned in the reference plane, and the bag is rotated during this transfer, so that a perpendicular line passing through the center of the spout attachment opening is positioned in the reference plane. The bag is supplied in this state to the positioning device.

The positioning device described above includes a conveyor on which the supplied spout attachment bags are placed and which sends the bags forward, and it further includes a side edge stopper and a top edge stopper which are contacted by one side edge and the top edge, which are flanking the spout attachment opening of a spout attachment bag. The role of this positioning device is to position the distal end of a spout attachment bag and to reposition the perpendicular line passing through the center of the spout attachment opening in the reference plane. The side edge stopper and the top edge stopper are disposed so that the perpendicular line passing through the center of the spout attachment opening is positioned in the reference plane when the spout attachment bag on the conveyor are moved forward and has come to contact with the stoppers.

FIG. 10 (including part (a) and part (b)) shows a state in the positioning device in which a spout attachment bag 1 placed on the conveyor (not shown) is fed forward by the conveyor, and one side edge (which is sealed) 3 and the top edge 4 flanking the spout attachment opening 2 have come to contact with a side edge stopper 5 and a top edge stopper 6, respectively.

In the embodiment shown in the Japanese Patent Application No. 2014-043864 (Japanese Patent Application Laid-Open (Kokai) 2015-168459), a spout attachment bag whose corner is not cut (and thus no spout attachment opening has been formed) is supplied to the positioning device. This is because the step of cutting the corner is performed in the spout attachment apparatus. By contrast, the spout attachment bag 1 shown in FIG. 10 of the present application has its corner cut ahead of time in the bag production step, and the spout attachment bag 1 in which the spout attachment opening 2 has been formed is supplied to the positioning device.

Generally, cutting errors would occur when a corner of a spout attachment bag is cut in bag manufacturing steps. The cutting error referred to here is that in which the cut length (the length of the spout attachment opening 2) deviates from the reference value; and if such a cutting error occurs, as seen from FIG. 10, the position of the distal end (the spout attachment opening 2) of the spout attachment bag 1 positioned by the side edge stopper 5 and the top edge stopper 6 deviates from a reference position. In the example in FIG. 10, if the cut length L0 of the spout attachment bag 1 shown in part (a) of FIG. 10 is the reference value for the cut length, then the reference position is that which is indicated by the straight line P0 (hereinafter referred to as the reference position P0). Meanwhile, the cut length L of the spout attachment bag 1 shown in part (b) of FIG. 10 is somewhat longer than the above-mentioned reference value (L>L0), and therefore the position of the distal end (the spout attachment opening 2) of the spout attachment bag 1 is moved back by a distance of d1 from the reference position P0. Conversely, if the cut length L of the spout attachment bag 1 is shorter than the reference value (L<L0), then the position of the distal end (the spout attachment opening 2) of the spout attachment bag 1 is moved forward by a specific distance from the reference position P0.

If the position of the distal end (the spout attachment opening 2) of the spout attachment bag 1 deviates from the reference position P0, when that spout attachment bag 1 is supplied to a spout attachment apparatus and is gripped by grippers of the spout attachment apparatus, the height of the spout attachment opening 2 of that spout attachment bag 1 will deviate from the reference height and, as a result, the sealing position of the spout will be offset, which diminishes the appearance of the bag and can decrease the seal strength of the bag.

On the other hand, as shown in FIG. 11, if the positioning of the spout attachment bag 1 by the positioning device is performed by a distal end stopper 7 that is in contact with the distal end (the spout attachment opening 2) of the spout attachment bag 1 and the side edge stopper 5 that is in contact with the side edge 3, then no deviation will occur in the position of the distal end (the spout attachment opening 2) of the spout attachment bag 1 from the reference position. In this case, however, a problem that occurs is that a perpendicular line M passing through the center of the spout attachment opening 2 of the spout attachment bag 1 deviates from the reference plane. In the example of FIG. 11, the cut length L0 of the spout attachment bag 1 shown in part (a) of FIG. 11 is the reference value for length, in which it is assumed that the perpendicular line M passing through the center of the spout attachment opening 2 is positioned in the reference plane N. On the other hand, the cut length L of the spout attachment bag 1 shown in part (b) of FIG. 11 is somewhat shorter than the reference value (L<L0), and therefore the position of the perpendicular line M passing through the center of the spout attachment opening 2 of the positioned spout attachment bag 1 deviates by a distance d2 from the reference plane N.

If the position of the perpendicular line M passing through the center of the spout attachment opening 2 of the spout attachment bag 1 deviates from the reference plane N, when that spout attachment bag 1 is supplied to a spout attachment apparatus, the left and right grippers of the spout attachment apparatus may not be able to grip the bag properly, or the seal position of the spout may deviate from the center of the spout attachment opening 2. This can diminish the appearance of the bag and cause an imperfect seal, resulting in that the problem is more serious than when the position of the distal end (the spout attachment opening 2) of the spout attachment bag 1 deviates from the reference position P0.

When the spout attachment bag 1 is positioned by the side edge stopper 5 and the top edge stopper 6, even if the cut length of the spout attachment bag 1 should deviate from the reference value, substantially no deviation would occur for the position of the perpendicular line M passing through the center of the spout attachment opening 2 from the reference plane N.

BRIEF SUMMARY OF THE INVENTION

The present invention is conceived in light of the above problems with an apparatus for supplying spout attachment bags (a bag to which a spout is to be attached). In another word, the present invention was conceived in light of the problems that occur in a positioning device that includes a conveyor, on which the supplied spout attachment bags are placed and which sends them forward, and a side edge stopper and a top edge stopper, which are contacted by one side edge and the top edge flanking the spout attachment opening of a spout attachment bag.

It is, therefore, an object of the present invention to provide an apparatus that prevents the height of the spout attachment opening of a spout attachment bag from deviating from the reference height when this spout attachment bag is supplied to a spout attachment apparatus, even when a cutting error occurs at the corner of the spout attachment bag as described above and thus the position of the distal end (the spout attachment opening) of the spout attachment bag positioned by the side edge stopper and the top edge stopper deviates from a reference position.

The above object is accomplished by a unique structure of the present invention for an apparatus for supplying spout attachment bags, which is used when supplying a spout attachment apparatus with spout attachment bags each having a spout attachment opening formed in one corner thereof; and the apparatus for supplying spout attachment bags of the present invention comprises:
 a positioning device that positions each of the spout attachment bags at a specific position in a horizontal orientation in which the spout attachment opening of the bag is facing forward,
 a first transfer device that transfers the spout attachment bag to the positioning device, the bag being in a horizontal orientation and the spout attachment opening facing forward with reference to the direction the bag is supplied, and
 a second transfer device that transfers upward the spout attachment bag positioned by the positioning device and, in the course of (or during) this transfer, it changes the spout attachment bag from the horizontal orientation to a vertical orientation in which the spout attachment opening is facing upward and is horizontal.

The terms "vertical" and "horizontal" used herein are not limited to the meanings of vertical and horizontal in the strict sense, and they encompass "substantially vertical" and "substantially horizontal" to the extent that the effect of the invention is not affected.

In the present invention, the positioning device includes:
 a conveyor on which supplied spout attachment bag is placed and which sends the bag forward, and
 a side edge stopper and a top edge stopper which are contacted by one side edge and the top edge flanking the spout attachment opening of the spout attachment bag.

One vertical plane in this positioning device is set as a positioning reference plane, and the side edge stopper and the top edge stopper of the positioning device are disposed so that a perpendicular line passing through the center of the spout attachment opening is located in this reference plane when the spout attachment bag has come into contact with the stoppers.

The second transfer device includes:
 an arm fixed to a rotary shaft that is provided horizontally,
 a servo motor (which is a driving source) that rotates the rotary shaft and reciprocally swings the arm, and
 a suction member that is provided at the distal end of the arm and is moved within a plane parallel to the reference plane along with the swing of the arm.

When the arm has swung downward, the suction member picks up the spout attachment bag and, when the arm swings upward, the spout attachment bag picked up by the suction member is raised and changed from its horizontal orientation to its vertical orientation.

The device for supplying spout attachment bags according to the present invention is can be further provided with:
 a sensing device that senses the position of the spout attachment opening of a spout attachment bag positioned by the positioning device, and
 a control device that compares the position of the spout attachment opening sensed by the sensing device to a preset reference position and controls the operation of the servo motor on the basis of the amount of deviation between the two positions.

The control device has functions to control the operation of the servo motor to correct the position of the swing end of the arm that are swung upward and to keep steady the height position of the spout attachment opening of each of the spout attachment bags that have been changed to a vertical orientation.

The apparatus for supplying spout attachment bags of the present invention has the following embodiments, for example.

(1) The suction member of the second transfer device can be designed such that its suction face faces outward in the normal direction relative to the (arc-shaped) movement path of the suction member, and the positioning device is able to move up and down, so that when the arm of the second transfer device comes to its lower swing end and the suction face of the suction member at the end of the arm faces down, the positioning device is moved up and then moved down. When the positioning device has moved up, the positioned spout attachment bag is picked up by the suction member.

(2) The first transfer device can be designed so that it includes a support shaft which is disposed vertically, is able to be moved up and down and rotated and is further moved reciprocally along the transfer direction of the spout attachment bags and so that a suction member is installed at the lower end of the support shaft with its suction face facing down. In this structure, the rotational axis of the support shaft is located in the reference plane even during its reciprocal motion, the spout attachment bag positioned in a horizontal orientation is picked up by the suction member, lifted upward, and transferred while being kept in a horizontal orientation, and the spout attachment bag is then rotated in the course of this transfer, so that the perpendicular line passing through the center of the spout attachment opening is positioned in the reference plane.

According to the apparatus for supplying spout attachment bags according to the present invention, the height of the spout attachment opening of a spout attachment bag is prevented from deviating from the reference height when this spout attachment bag is supplied to the spout attachment apparatus, even when a cutting error occurs at the corner of a spout attachment bag (when the length of the spout attachment opening deviates from the reference value) and the position of the distal end (the spout attachment opening) of the spout attachment bag positioned by the side edge stopper and the top edge stopper deviates from the reference position.

DETAILED DESCRIPTION OF THE INVENTION

An apparatus for supplying spout attachment bags according to the present invention will now be described in detail with reference to FIGS. 1 to 9d.

Figure 1:
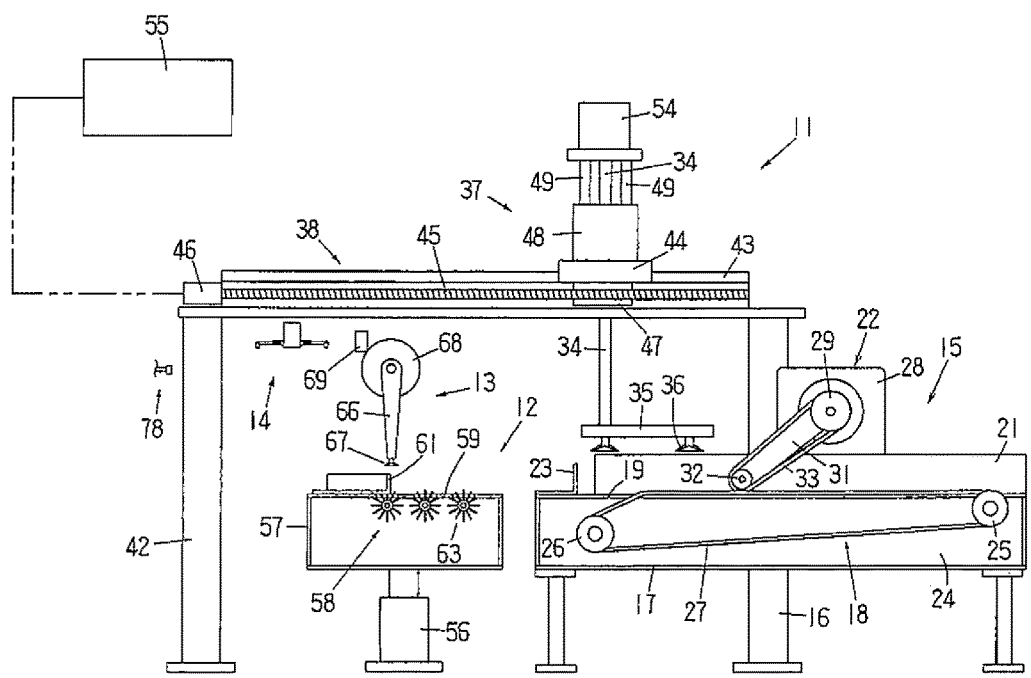
FIG. 1 is a side view of the apparatus for supplying spout attachment bags according to the present invention.

As shown in FIG. 1, an apparatus for supplying spout attachment bags according to the present invention (hereinafter referred to simply as a "bag supply apparatus") comprises a first transfer device 11, a positioning device 12, a second transfer device 13, and a handover device 14. A conveyor magazine 15 is disposed near the first transfer device 11. The first transfer device 11 is the same as the rotary transfer device described in the specification and drawings of the Japanese Patent Application No. 2014-043864 (Japanese Patent Application Laid-Open (Kokai) No. 2015-168459).

Figure 3:
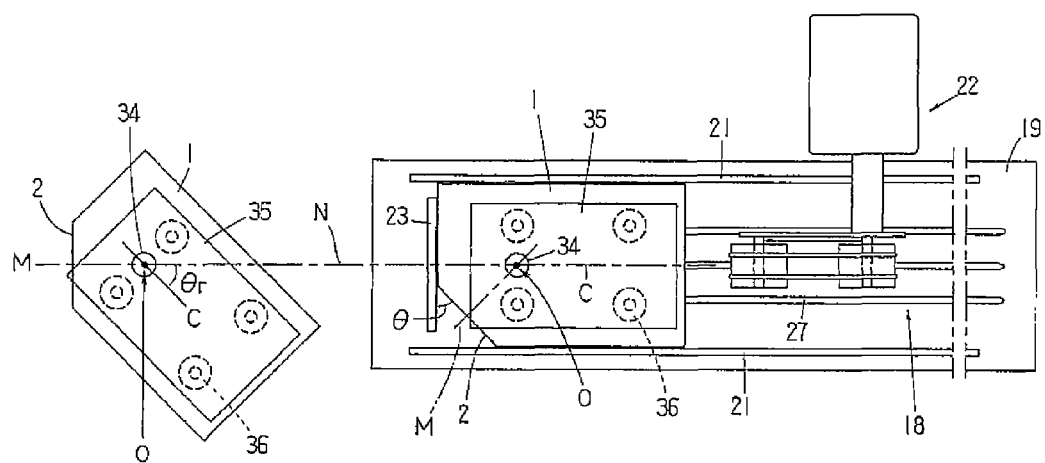
FIG. 3 is a top view illustrating, in step order, the operation of the first transfer device (rotary transfer device) shown in FIG. 1, with the illustration on the left showing a spout attachment bag as well as a support shaft and suction members at the movement end point, and the illustration on the right showing the movement starting point.

The conveyor magazine 15 itself is known (see Japanese Patent Application Laid-Open (Kokai) No. 2010-36913, for example); and as shown in FIGS. 1 and 3, it comprises a box 17 installed on a base 16, a conveyor belt 18 installed in the box 17, guide plates 21 (only one shown) installed on the left and right sides of the conveyor belt 18 on the upper plate 19 of the box 17, a fast transfer device 22 disposed above the conveyor belt 18, and a positioning stopper 23 installed on the upper plate 19.

The conveyor belt 18 includes pulleys 25 and 26, which are rotatably supported by left and right side plates 24 (only one side plate 24 is shown in FIG. 1) of the box 17, and a plurality of belts 27, which are installed around the pulleys 25 and 26. The pulleys 26 are connected to a drive source (not shown) installed in the box 17 and rotated thereby. The pulleys 25 protrude, at their upper ends, from holes formed in the upper plate 19. The pulleys 26 are disposed within the box 17 entirely. Upon leaving the pulleys 25, a part of each of the belts 27 is moved forward while sliding over the upper plate 19 and then goes into the box 17 through each of the holes formed in the upper plate 19 before reaching the pulley 26.

The fast transfer device 22 is comprised of a drive box 28 that is installed on the box 17 and houses therein a drive mechanism (including an internal drive source (motor)), a pulley 29 that is connected to the drive mechanism inside the drive box 28 and rotated thereby, a free arm 31 that is pivotably attached to the drive box 28 and is concentric with the pulley 29, a pulley 32 that is attached to the distal end of the free arm 31, and a fast transfer belt 33 that is installed around the pulleys 29 and 32.

In the conveyor magazine 15, numerous empty bags (an empty bag group) are stacked on the belts 27 so that their mouths are facing forward (to the left in FIG. 1) and the top bag in the stack is shifted forward. The left and right edges of the bags are guided by the guide plates 21, and the bags are conveyed forward (toward left side in FIG. 1) over a horizontal plane by the belts 27. The bag here is the spout attachment bag 1, in which the corner of the side edge 3 and the top edge 4 has been cut off obliquely to form the spout attachment opening 2. The conveyance direction of the belts 27 is parallel to the length direction of the spout attachment bags 1.

When the uppermost bag in the empty bag group on the belts 27 comes into contact with the fast transfer belt 33, since the speed of the fast transfer belt 33 is set so as to be higher than the speed of the belts 27, one bag (the top bag in the stack) is separated and quickly fed forward, and then stopped to be positioned when its distal end (the top edge 4) comes into contact with the stopper 23.

In the present invention, as described above, one vertical plane is set as a reference plane N. As shown in FIG. 3, each of the spout attachment bags 1 is positioned in the conveyor magazine 15 such that the center line (a straight line passing through the width direction center) C is located in the reference plane N.

Figure 2:
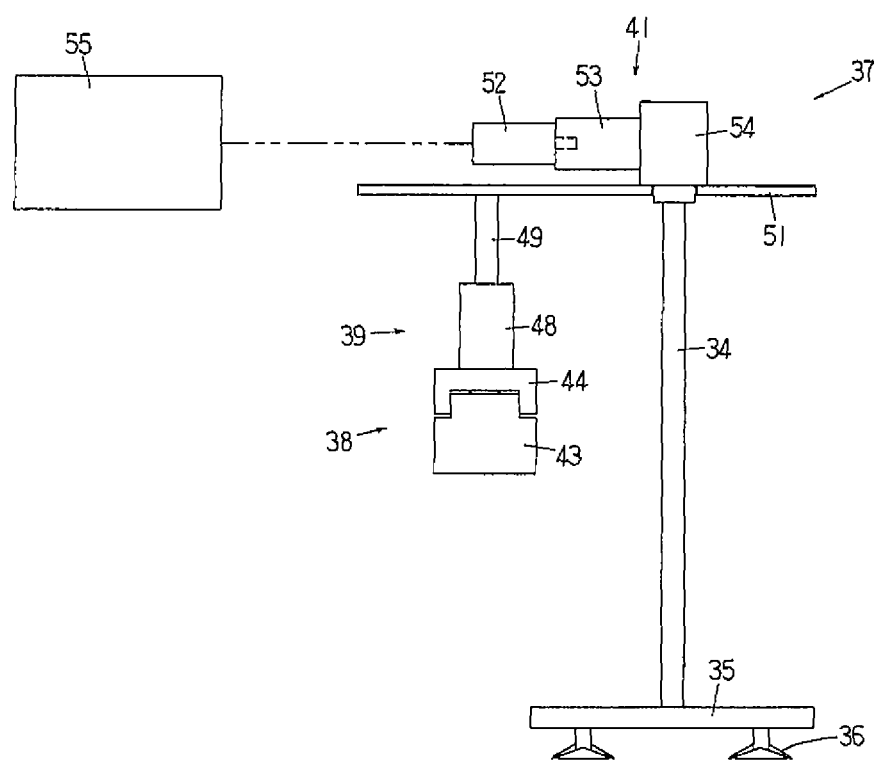
FIG. 2 is a front view of the main components of a first transfer device (rotary transfer device) in the apparatus for supplying spout attachment bags shown in FIG. 1.

As seen from FIGS. 1 and 2, the first transfer device 11 is comprised of a plurality of suction members (suction cups) 36, which are attached, facing down, via an attachment plate 35 to the lower end of a support shaft 34 that hangs down vertically. The first transfer device 11 is further comprised of a rotary transfer mechanism 37, which raises and lowers the support shaft 34 (and the suction cups 36) and moves the support shaft 34 forward and backward and also rotates the shaft 34 by a specific angle in the course of this movement.

The rotary transfer mechanism 37 is comprised of a linear movement mechanism 38 that moves the support shaft 34 in a straight line horizontally, an elevating mechanism 39 that moves the support shaft 34 up and down, and a rotation mechanism 41 that rotates the support shaft 34. All of these are installed on a base 42.

The linear movement mechanism 38 is comprised of a horizontal, linear lane 43 that is installed on the base 42, a sliding member 44 that slides forward and backward along a straight horizontal path on the lane 43, a ball screw mechanism (not shown) that is installed in the interior of the lane 43, and a drive source (servo motor) 46 that rotates a threaded shaft 45 of this ball screw mechanism. The reference numeral 47 is a ball screw nut having a built-in ball. The ball screw nut 47 is fixed to the sliding member 44.

The elevating mechanism 39 includes a drive source (air cylinder) 48 that is installed on the sliding member 44.

The rotation mechanism 41 is installed on an attachment plate 51 fixed to the upper end of a piston rod 49 of the air cylinder 48, and it includes a drive source (servo motor) 52, a reduction gear 53 that is linked to the servo motor 52, and an axial direction conversion device 54 that is linked to the reduction gear 53 and converts the direction of the rotational axis from horizontal to vertical. The support shaft 34 of the suction cups 36 is connected to the output shaft (not shown) of the axial direction conversion device 54.

The operation of the servo motor 46, the air cylinder 48, and the servo motor 52 is controlled by a control device 55.

In the conveyor magazine 15, when the spout attachment bag 1 comes into contact with and is thus positioned by the stopper 23, the support shaft 34 (and the suction cups 36) of the first transfer device 11 descends, the spout attachment bag 1 is picked up at its upper surface by the suction cups 36 and then raised. The bag is next linearly moved a specific distance forward (to the left in FIG. 1), is lowered at the movement end point and then is released from the suction cups 36. During this movement, the rotational axis of the support shaft 34, that is, the rotational axis O of the suction cups 36, is positioned in the reference plane N (see FIG. 3), and the support shaft 34 (suction cups 36) rotates by a specific angle around the rotational axis O. The fact that the rotational axis O is positioned in the reference plane N while the suction cups 36 are moving means that the movement direction of the suction cups 36 (the transfer direction of the spout attachment bag 1) is parallel to the center line C of the spout attachment bag 1 positioned in the conveyor magazine 15.

As seen from FIG. 3, the position of the rotational axis O when the spout attachment bag 1 is picked up by the suction cups 36 (the initial position) is set to a position where the perpendicular line M passing through the center of the spout attachment opening 2 of the positioned spout attachment bag 1 intersects the reference plane N.

The rotational angle $\theta r$ at which the support shaft 34 (suction cups 36) rotates is set to be the same as the inclination angle $\theta$ of the spout attachment opening 2 of the spout attachment bag 1 ($\theta r = \theta$).

By setting the rotational angle $\theta r$ of the suction cups 36 and the initial position of the rotational axis O as described above, when the support shaft 34 (suction cups 36) arrives at the movement end point, the spout attachment bag 1 that has been picked up by the suction cups 36 will be such that the perpendicular line M passing through the center of the spout attachment opening 2 is positioned in the reference plane N, and the spout attachment opening 2 is perpendicular to the reference plane N. The illustration on the left side of FIG. 3 shows the spout attachment bag 1 and the support shaft 34 (suction cups 36) after arrival at the movement end point.

Figure 4:
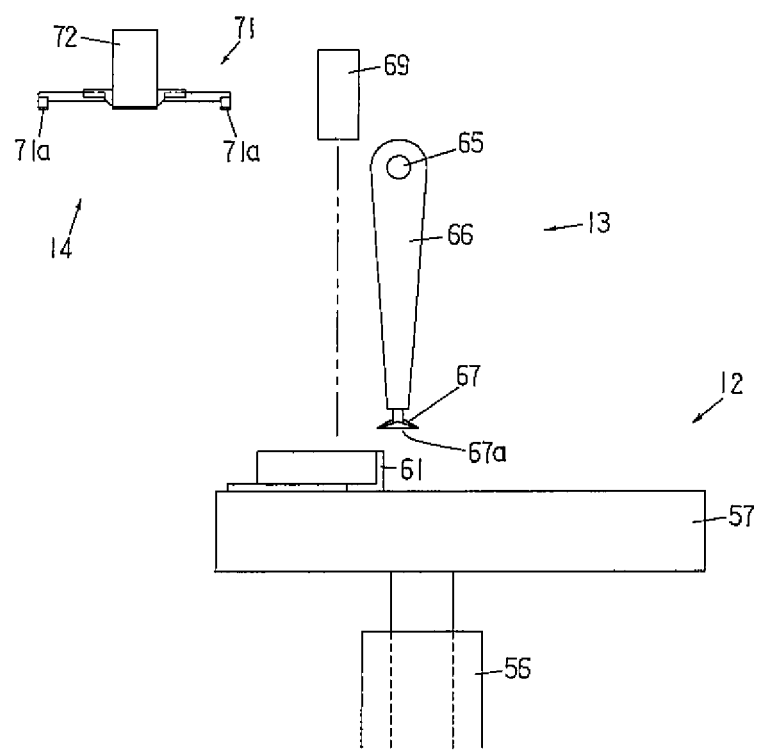
FIG. 4 is a front view illustrating, in step order, the operation of a second transfer device and a positioning device in the apparatus for supplying spout attachment bags shown in FIG. 1.
Figure 5:
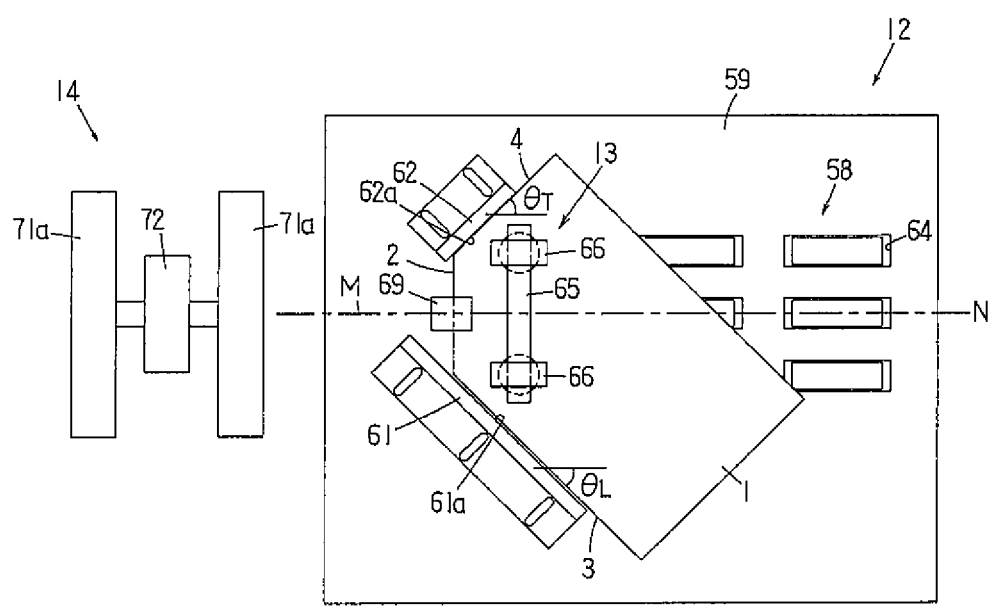
FIG. 5 is a top view of the second transfer device and the positioning device shown in FIG. 4.
Figure 6:
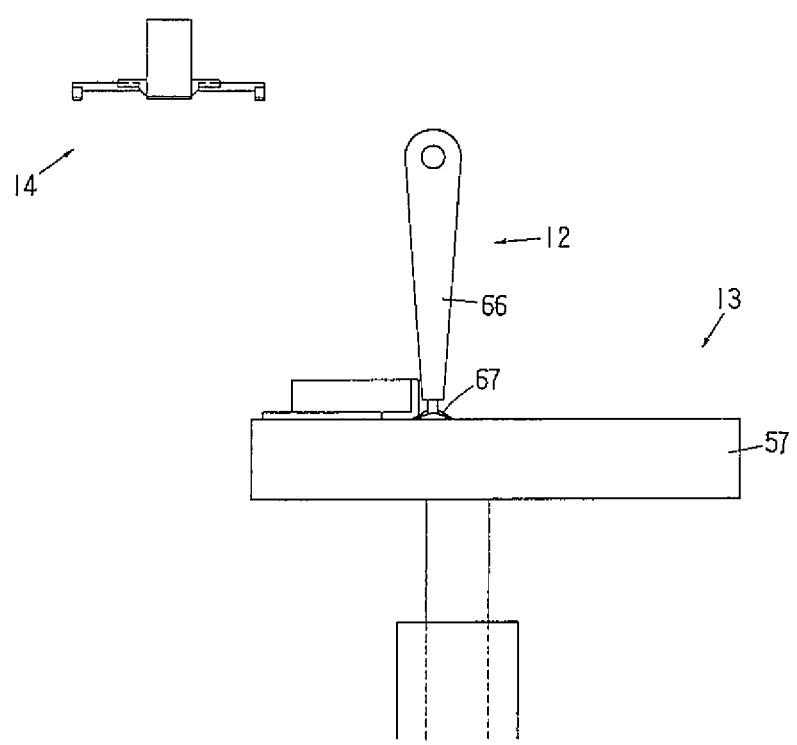
FIG. 6 is a front view illustrating, in step order, the operation of the second transfer device and the positioning device in the apparatus for supplying spout attachment bags shown in FIG. 1.

The positioning device 12 is as shown in FIGS. 1, 4 and 5. It comprises a box 57 that is installed on a base 56, a conveyor 58 that is installed in the box 57, and positioning stoppers 61 and 62 that are installed on an upper plate 59 of the box 57.

A drive source (air cylinder, not shown) that moves the box 57 up and down is provided in the base 56.

The conveyor 58 comprises rotary brushes 63 that are rotatably supported on the left and right side plates of the box 57 and a drive source (motor, not shown) that is installed in the box 57 and rotates the rotary brushes 63. The rotational axis of the rotary brushes 63 is set so as to be perpendicular to the reference plane N, and the tops of the rotary brushes 63 protrude upwardly from holes 64 opened in the upper plate 59. When the spout attachment bag 1 is placed on the rotary brushes 63, it is sent forward and parallel to the reference plane N, causing the spout attachment bag 1 is brought into contact with the stoppers 61 and 62. Rollers (such as rollers whose outer peripheral face is rubber or that are entirely made of rubber) can be used instead of the rotary brushes 63.

The operation of the motor that rotates the rotary brushes 63 and the air cylinder that moves the box 57 up and down is controlled by a control device 55.

When the support shaft 34 (suction cups 36) of the first transfer device 11 arrives at the movement end point, the spout attachment bag 1 reaches a position that is above the positioning device 12 (the transfer end point position) and is released from the suction cups 36 so as to be placed on the conveyor 58 (the rotary brushes 63). The bag 1 is thus conveyed a very short distance forward and is positioned when it comes into contact with the stoppers 61 and 62 as shown in FIG. 5. In another word, one side edge 3 of the spout attachment bag 1 comes into contact with the stopper 61, and the top edge 4 of the bag 1 comes into contact with the stopper 62, and it can be said that the stoppers 61 and 62 are contacted by one side edge 3 and the top edge 4 flanking the spout attachment opening 2 of the spout attachment bag 1.

The object to convey the spout attachment bag 1 by the conveyor 58 (or by the rotary brushes 63) is to cause the side edge 3 and the top edge 4 of the spout attachment bag 1 to contact the stoppers 61 and 62 and thus to accomplish the repositioning of the bag 1. Accordingly, there is no need for the conveyance distance to be long, and rather a shorter distance allows the spout attachment bag 1 to be positioned accurately and in a short time, which improves the overall processing capability of the supply apparatus of the present invention. Therefore, the movement end point position of the rotational axis O of the support shaft 34 (suction cups 36) is preferably set so that when the spout attachment bag 1 has arrived at the transfer end point position, the side edge 3 and the top edge 4 of the bag 1 are as close (short distance) as possible to the stoppers 61 and 62.

As shown in FIG. 5, the positioning face 61a of the stopper 61 is used to position the side edge 3 of the spout attachment bag 1 (or one of the two side edges of the bag 1), and it is inclined at an angle of θL with reference to the reference plane N. The positioning face 62a of the stopper 62 is used to position the distal end (or the top edge 4) of the spout attachment bag 1, and it is inclined at an angle of θT relative to the reference plane N. The angle θL is set to be the same as the inclination angle θ (see FIG. 3) of the spout attachment opening 2 of the spout attachment bag 1 (θL=θ), and the angle θT is set to a complementary angle with θL (θT=90°−θL). Also, the left and right positions of the stoppers 61 and 62 are set so that when the spout attachment bag 1 is in contact snugly with the two stoppers 61 and 62, the spout attachment opening 2 is perpendicular to the reference plane N, and the perpendicular line M passing through the center of the spout attachment opening 2 is positioned in the reference plane N.

The second transfer device 13 is, as seen from FIG. 1, disposed above the positioning device 12. The role of this second transfer device 13 is to transfer the spout attachment bag 1 positioned by the positioning device 12 upward by lifting it up from the positioning device 12, and then to change the spout attachment bag 1 in the course of this transfer from its horizontal orientation to a vertical orientation, so that the spout attachment opening 2 of the bag 1 faces upward and is horizontal.

The second transfer device 13 is comprised of a revolving shaft 65 that is rotatably supported horizontally, a pair of arms 66 (see FIG. 5) that are fixed to the revolving shaft 65, suction members (suction cups) 67 that are installed at the distal ends of the arms 66, and a servo motor 68 (see FIG. 1) that rotates the revolving shaft 65 and thus reciprocally swings the arms 66. The operation of the servo motor 68 is controlled by the control device 55.

Figure 7:
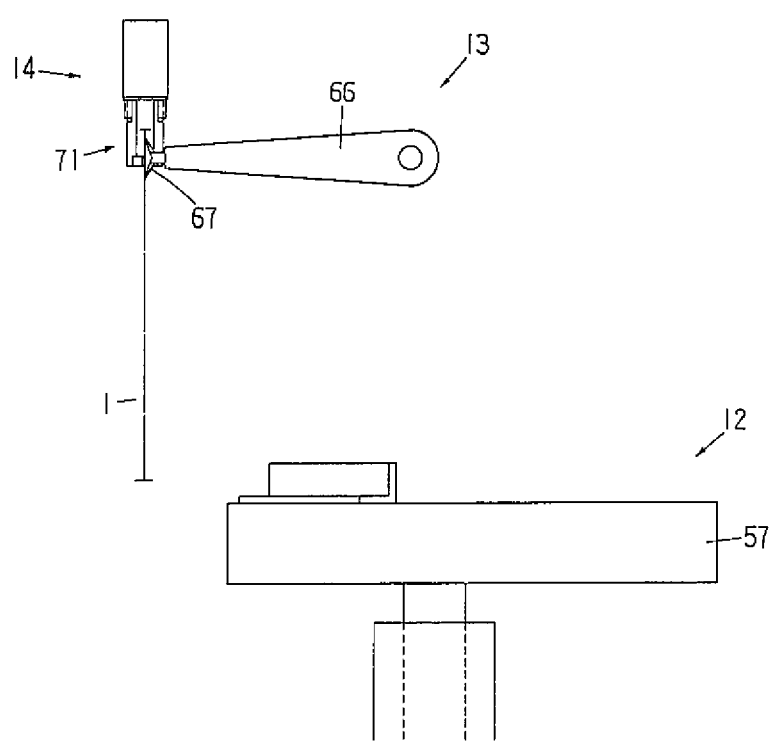
FIG. 7 is a front view illustrating, in step order, the operation of the second transfer device and the positioning device in the apparatus for supplying spout attachment bags shown in FIG. 1.

The revolving shaft 65 is horizontal and is perpendicular to the reference plane N, and the suction cups 67 are moved along an arc-shaped path in a plane that is parallel to the reference plane N when the arms 66 are made to swing. As shown in FIGS. 4 and 7, the arms 66 are swung reciprocally under the operation of the servo motor 68, so that they have, when swinging down, a position at which they are vertical and faces down (the lower swing end) and also have, when swinging up, a position at which they are substantially horizontal and faces forward (the upper swing end). The suction cups 67 are installed on the arms 66 so that the suction faces 67a face outward in the normal direction of the arc-shaped path of the suction cups 67 (or they face outward in the lengthwise direction of the arms 66). Therefore, the suction faces 67a of the suction cups 67 are horizontal and face down when the arms 66 are at the lower swing end, and they are substantially vertical and face forward when the arms 66 are at the upper swing end.

A detection device 69 is installed above the positioning device 12 as part of the supply apparatus of the present invention. The detection device 69 senses the position of the spout attachment opening 2 of the positioned spout attachment bag 1 in the reference plane N. Any of various kinds of detection device, such as those that make use of a laser or a CCD (Charge-Coupled Device), can be used as the detection device 69.

Figure 10:
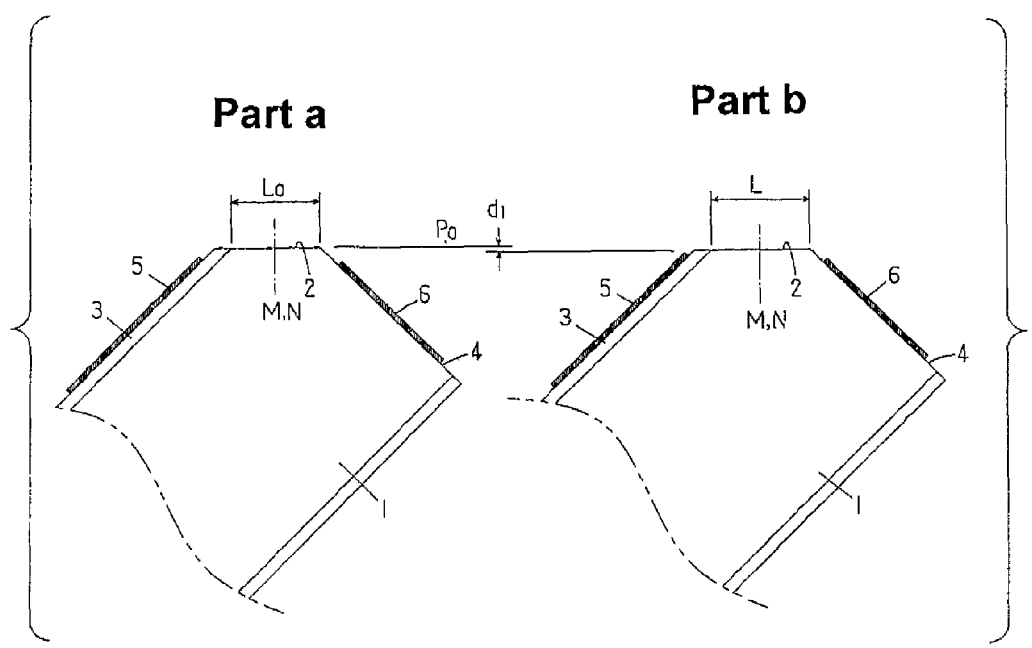
FIG. 10 (including part (a) and part (b)) is a top view illustrating the problem with a positioning device that includes a side edge stopper and a top edge stopper with which one side edge and the top edge flanking the spout attachment opening of a spout attachment bag come into contact.
Figure 11:
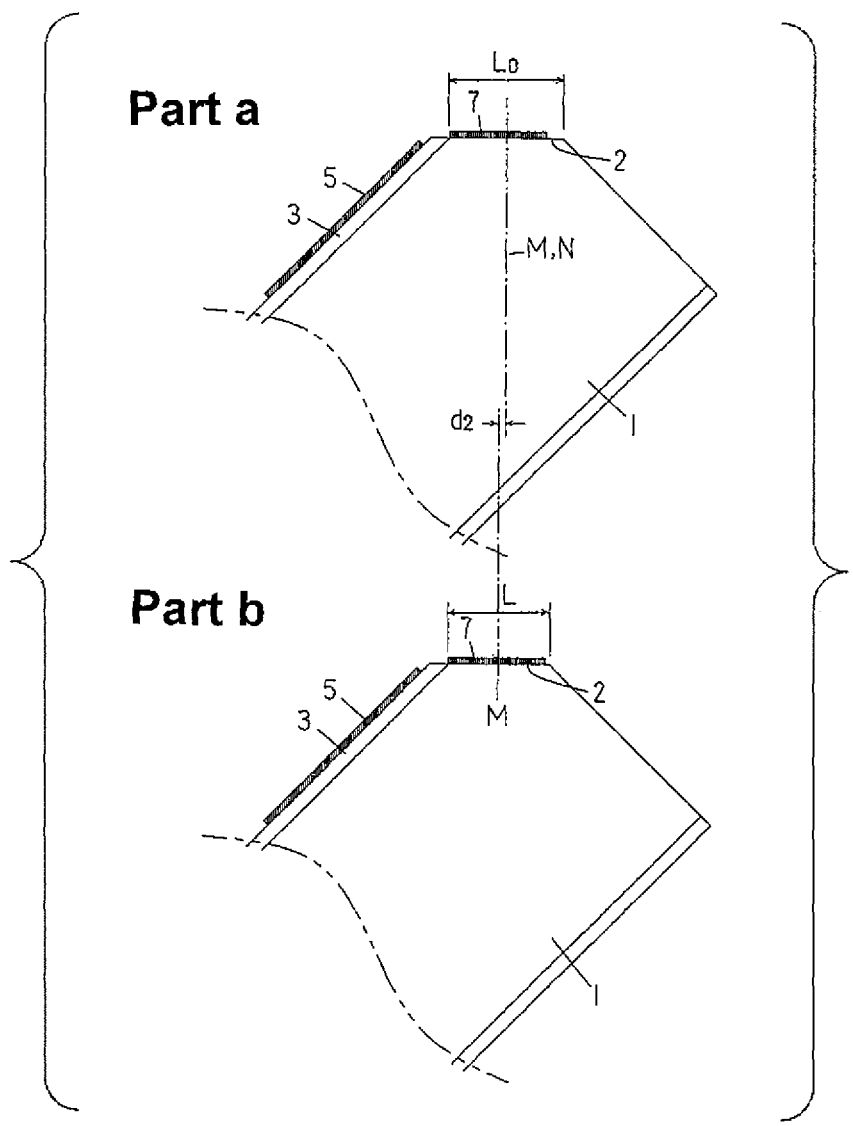
FIG. 11 (including part (a) and part (b)) is a top view illustrating the problem with a positioning device that includes a distal end stopper with which the spout attachment opening of a spout attachment bag comes into contact and a side edge stopper with which one side edge of the bag comes into contact.

The sensing signals of the detection device 69 are transmitted to the control device 55, and the control device 55 compares the sensed position of the spout attachment opening 2 to a preset reference position (see the reference position P0 shown in FIG. 10) based on the sensing signal and controls the operation of the servo motor 6 based on the amount of deviation between the two positions. For example, a rotary encoder that generates pulses according to rotation can be provided for the rotary shaft of the servo motor 68, the generated pulses are inputted to the control device 55, and the number of pulses is counted by a pulse counter. In the control device 55, the pulse count (reference pulse count) when the sensed position of the spout attachment opening 2 matches the reference position is inputted in advance; and the relationship of the amount of deviation between the two positions (the sensed position and the reference position) and the corrected pulse count (the pulse count obtained by increasing or decreasing from the reference pulse count) is also inputted in advance in the control device 55. The control device 55 controls the operation of the servo motor 68 based on this relationship (more specifically, it controls the position of the upper swing end of the arms 66).

The operation of the positioning device 12 and the second transfer device 13 will be described below in step order with reference to FIGS. 4 to 7.

In the positioning device 12, when a spout attachment bag 1 is positioned at a specific position by the stoppers 61 and 62 (see FIGS. 4 and 5), the position of the spout attachment opening 2 of the spout attachment bag 1 is sensed by the detection device 69. The sensing signal produced by the detection device 69 is transmitted to the control device 55, where the correct pulse count is determined. At this point, the arms 66 are vertical and the suction cups 67 are located at the lower swing end of the arms 66, and the suction faces 67a of the suction cups 67 are facing down and are substantially horizontal.

Then, the box 57 of the positioning device 12 is first raised (see FIG. 6) and then lowered by the operation of the air cylinder built into the base 56. When the box 57 has been raised, the surface of the spout attachment bag 1 positioned in the horizontal orientation on the upper plate 59 of the box 57 is pressed against the suction faces 67a of the suction cups 67 and is picked up thereby by suction.

Then, the servo motor 68 is operated to swing the arms 66 upward. When the pulse count generated by the rotary encoder, provided for the servo motor 68, reaches the corrected pulse count, the servo motor 68 is stopped, and thus the arms 66 are stopped in a position where they are substantially horizontal and facing forward (at the upper swing end) as seen from FIG. 7. As the arms 66 are swung, the spout attachment bag 1 held by the suction cups 67 are raised along an arc-shaped path (not illustrated); and when the arms 66 are stopped at the swing end, the bag is in a substantially vertical orientation in which the spout attachment opening 2 is facing upward and is horizontal.

In this example, the operation (pulse count) of the servo motor 68 is set so that when the sensed position of the spout attachment opening 2 matches the reference position (or when there is zero deviation between the two positions), the arms 66 make a swing of 90° from the lower swing end to the upper swing end and are horizontal at the upper swing end (so that the spout attachment bag 1 held by the suction cups 67 is in a vertical orientation).

Meanwhile, the relationship between the corrected pulse count and the amount of deviation between the two positions (the sensed position of the spout attachment opening of the bag and the reference position) is set so that when the arms 66 are stopped at the swing end, the height position of the spout attachment opening 2 will be constant, regardless of the amount of deviation between the two positions.

Therefore, if the sensed position of the spout attachment opening 2 is ahead of (or is at an advanced position from) the reference position (or if the deviation between the two positions is positive), then the swing angle of the arms 66 from the lower swing end (unchanged) to the upper swing end is set slightly less than 90°. If the sensed position of the spout attachment opening 2 is behind (or is at a receded position from) the reference position (if the deviation between the two positions is negative), then the swing angle of the arms 66 is set slightly more than 90°. When there is deviation between the two positions (the sensed position of the spout attachment opening 2 and the reference position), the spout attachment bag 1 held by the suction cups 67 of the arms 66 that are stopped at the upper swing end will be in a substantially vertical orientation, although not in a vertical orientation in the strict sense. Nonetheless, such a substantially vertical orientation will not adversely affect the subsequent supply steps.

The handover device 14 is disposed ahead of (or at an advanced position from) the second transfer device 13 (the advance position being on the left side in FIG. 1), and its role is to receive from the second transfer device 13 the spout attachment bag 1 that has been changed to a substantially vertical orientation in which the spout attachment opening 2 is facing up and is horizontal and then to transfer this bag to the grippers of the spout attachment apparatus (described below). The handover device 14 is, as seen from FIG. 4, comprised of a chuck 71, which includes a pair of gripping members 71a that are wide in the horizontal direction (or spacedly provided horizontally), and a chuck opening and closing mechanism 72, which opens and closes the chuck 71. A known air chuck, for example, can be used as the handover device 14. The chuck opening and closing mechanism 72 and the chuck 71 are moved reciprocally along a horizontal path, which is parallel to the reference plane N, between the position where the spout attachment bag 1 is received from the second transfer device 13 (reception position) and the position where the spout attachment bag 1 is transferred to the grippers (transfer position).

The chuck 71, being opened at the reception position, is in a standby mode (see FIGS. 4 to 6), and then it closes immediately after the arms 66 of the second transfer device 13 have stopped at the upper swing end (see FIG. 7), thus gripping near the spout attachment opening 2 of the spout attachment bag 1 that has been changed to a substantially vertical orientation. The spout attachment bag 1 is next released from the suction cups 67 of the second transfer device 13, after which the servo motor 68 is operated so that the arms 66 are swung back to their lower swing end, while the chuck opening and closing mechanism 72 and the chuck 71 are moved horizontally, and then the spout attachment bag 1 is transferred to the grippers at the transfer position.

An example of a spout attachment apparatus to which the bag supply apparatus according to the present invention is used for will now be described with reference to FIGS. 8 and 9d.

Figure 8:
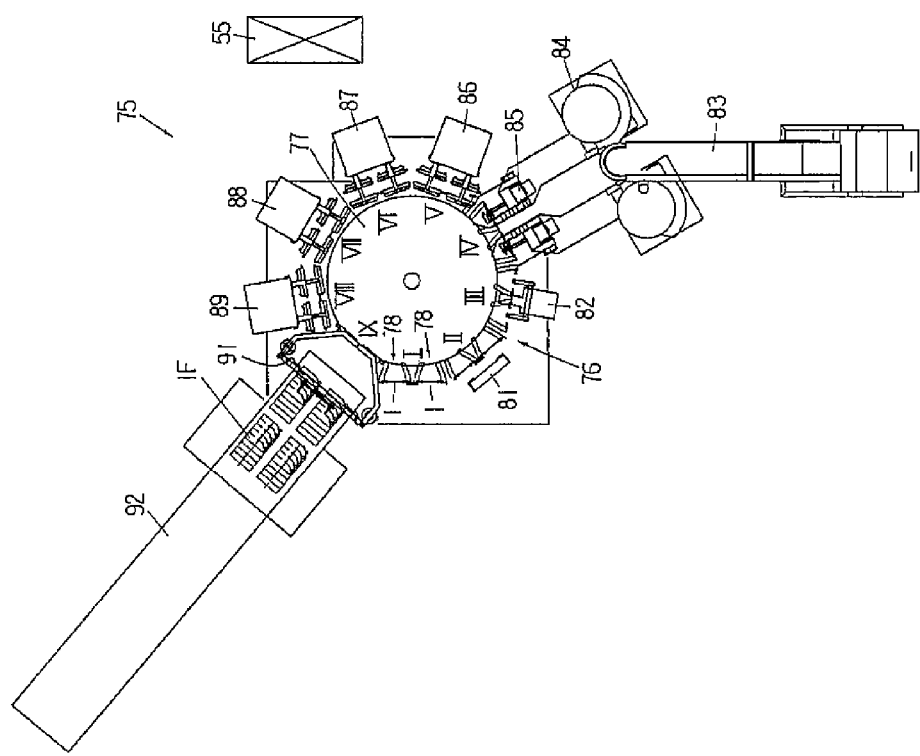
FIG. 8 is a top view of a spout attachment apparatus to which the apparatus for supplying spout attachment bags according to the present invention is applied.

The spout attachment apparatus 75 shown in FIG. 8 is a double attachment type, and various devices (described below) for carrying out the spout attachment operation are disposed around a double rotary bag transfer device 76 (see Japanese Patent Application Laid-Open (Kokai) No. 2004-244085, for example). By the rotary bag transfer device 76, two spout attachment bags 1 are simultaneously transferred intermittently along the circular transfer path, and the two spout attachment bags 1 undergo various spout attachment operations simultaneously at various stop positions. Nonetheless, the description below will be made for processing of one of the two bags.

The rotary bag transfer device 76 has two sets of grippers 78 at constant-angle intervals (a total of 18 sets) around an intermittently rotating table 77. The grippers 78 are rotated intermittently at a constant angle along a circular movement path, stopping nine times during one rotation. They grip the supplied spout attachment bags 1, and then the gripped spout attachment bags 1 are subjected to various spout attachment steps by the various devices disposed at the stop positions.

The first stop position of the grippers 78 (stop position I) is a stop position where the spout attachment bags 1 are supplied from the above-mentioned bag supply apparatus, and two of the bag supply apparatus are disposed in parallel near the stop position I (not shown in FIG. 8). When the chuck 71 of the handover device 14 reaches the transfer position, the grippers 78 that had stopped at stop position I are closed, so that a pair of grippers 78a grip the side edges 3 and 79 of the spout attachment bag 1 (see FIG. 9a). Then the chuck 71 is opened, and the spout attachment bag 1 is transferred from the handover device 14 to the grippers 78 (this is the supply of a spout attachment bag 1 from the supply device to the spout attachment apparatus). At this point of transfer, the spout attachment bag 1 is in the vertical orientation in which the spout attachment opening 2 is facing up and is horizontal, and the perpendicular line M passing through the center of the spout attachment opening 2 is vertical and positioned in the reference plane N.

A printing device 81 is disposed near the second stop position (stop position II), and an opening device 82 is disposed near the third stop position (stop position III). A spout supply conveyor 83, a parts feeder 84, and a spout insertion and temporary sealing device 85 are disposed near the fourth stop position (stop position IV). In addition, a first sealing device 86 is disposed near the fifth stop position (stop position V), a second sealing device 87 is disposed near the sixth stop position (stop position VI), and a third sealing device 88 is disposed near the seventh stop position (stop position VII). A cooling device 89 is disposed near the eighth stop position (stop position VIII), and further a bag discharge device 91 and a conveyor 92 are disposed near the ninth stop position (stop position IX).

The control device 55 is provided so that it controls not only the bag supply apparatus but all of the devices that make up the spout attachment apparatus 75.

The manner of spout attachment performed by the spout attachment apparatus 75 will be described below with reference to FIGS. 8 and 9a through 9d.

Figure 9A:
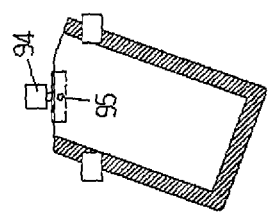
FIGS. 9a to 9d are diagrams illustrating, in step order, a spout attachment step that is performed by the spout attachment apparatus shown in FIG. 8.

As seen from FIG. 9a, a spout attachment bag 1 is gripped by the grippers 78 in a vertical orientation in which the spout attachment opening 2 of the bag 1 is horizontal. When the grippers 78 are stopped at stop position III (see FIG. 8), the opening device 82 is operated. As a result, a pair of suction cups 93 are moved forward as shown in FIG. 9a so as to come closer to each other, applying suction to both sides of the spout attachment bag 1, and then the suction cups 93 are retracted (or separated from each other) to pull open the spout attachment opening 2.

Figure 9B:
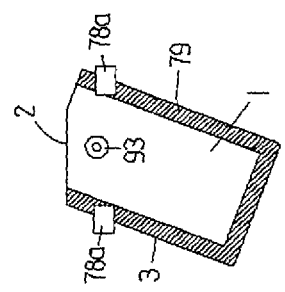

At stop position IV, the spout insertion and temporary sealing device 85 is operated, so that a spout 94 is inserted into the center of the spout attachment opening 2 of the spout attachment bag 1 as shown in FIG. 9b, and then the spout 94 is temporarily sealed to both interior sides of the spout attachment opening 2. The reference numeral 95 in FIG. 9b is a temporary sealing point.

Figure 9C:
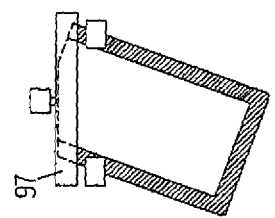
Figure 9D:
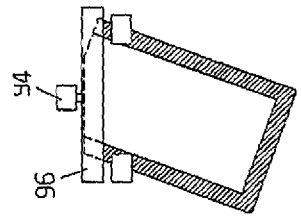

At stop positions V to VII, the sealing devices 86 to 88 are operated, so that the spout 94 is sealed to the films on both sides of the spout attachment bag 1 as shown in FIG. 9c; and at the same time the films on both sides of the spout attachment bag 1 are sealed to each other. The reference numeral 96 in FIG. 9c is a hot plate.

At stop position VIII, the cooling device 89 is operated, and the seals made as described above are cooled as shown in FIG. 9d. The reference numeral 97 in FIG. 9d is a cooling plate.

At stop position IX, the bag discharge device 91 is operated, so that each spout attachment bag 1 that has undergone the spout attachment step (and is thus equipped with a spout) is received from each of two sets of the grippers 78 (a total of two bags), and these bags are arranged in two rows on the conveyor 92. On the conveyor 92, later-discharged bags go under the earlier-discharged bags (see FIG. 7 of Japanese Patent Application Laid-Open (Kokai) No. H8-337217), and bag groups 1F comprised of numerous spout attached bags stack up in a state in which the bags are staggered in their width direction by about one-third the bag width. The conveyor 92 is the conveyor of a conveyor magazine that supplies the spout attached bags to a filling device (not shown), and the stacked bag groups 1F are supplied directly to the filling device.

In the above example, the handover device 14 is installed as part of the apparatus for supplying the spout attachment bags 1. However, this handover device 14 is not essential. In such a case that no handover device 14 is provided, it can be designed so that when the arms 66 of the second transfer device 13 have reached their upper swing end, the spout attachment bags 1 held by the suction cups 67 is gripped by the grippers 78 of the spout attachment apparatus.

Also, in the above description, although the filling of the spout attachment bags 1 with a liquid in the spout attachment apparatus is not described, it is also possible to perform the filling before or after the spout attachment step in the spout attachment apparatus. In that case, the spout attachment apparatus can be called a spout attachment and filling apparatus.

The invention claimed is:

1. An apparatus for supplying spout attachment bags for supplying a spout attachment apparatus with spout attachment bags each having a spout attachment opening in one corner thereof, said apparatus comprising:
    a positioning device for positioning a spout attachment bag at a specific position in a horizontal orientation in which a spout attachment opening of the spout attachment bag faces forward,
    a first transfer device for transferring the spout attachment bag, which is in a horizontal orientation and in which a spout attachment opening thereof is facing forward, to said positioning device, and
    a second transfer device for transferring upward the spout attachment bag positioned by said positioning device and, in a course of said transfer, changing the spout attachment bag from a horizontal orientation to a vertical orientation in which the spout attachment opening faces upward and is horizontal,
wherein
said positioning device is comprised of:
    a conveyor on which a supplied spout attachment bag is placed and which sends said bag forward, and
    a side edge stopper and a top edge stopper which are contacted by one side edge and a top edge flanking the spout attachment opening of the spout attachment bag,
    one vertical plane being set as a positioning reference plane, and
    said side edge stopper and said top edge stopper being disposed so that a perpendicular line passing through a center of the spout attachment opening of the spout attachment bag is located in said reference plane when the spout attachment bag has come into contact with said stoppers,
said second transfer device is comprised of:
    an arm fixed to a rotary shaft which is provided horizontally,
    a driving source for rotating said rotary shaft and reciprocally swings said arm, and
    a suction member which is provided at a distal end of said arm and is moved within a plane parallel to said reference plane when said arm is swung, and
    when said arm is swung downward, said suction member picks up the spout attachment bag, and
    when said arm is swung upward, the spout attachment bag picked up by said suction member is raised and changed from a horizontal orientation to a vertical orientation; and
said apparatus for supplying spout attachment bags is further comprised of:
    a detection device for sensing a position of the spout attachment opening of said bag positioned by said positioning device, and
    a control device for comparing a position of the spout attachment opening sensed by said detection device to a preset reference position, and for controlling operation of said driving source based on an amount of deviation between said two positions, said control device controlling the operation of said driving source to correct a position of a swing end of said arm that is swung upward, thus keeping steady a height position of the spout attachment opening of the spout attachment bag that is in a vertical orientation.

2. The apparatus for supplying spout attachment bags according to claim 1, wherein
said suction member of said second transfer device is provided so that a suction face thereof faces outward in normal direction of a movement path of said suction member, and
said positioning device is provided so as to be moved up and down, so that said positioning device is moved up when said arm of said second transfer device comes to a lower swing end thereof and said suction face of said suction member faces down, and then said positioning device is moved down; and when said positioning device is moved up, the positioned spout attachment bag is picked up by said suction member.

3. The apparatus for supplying spout attachment bags according to claim 1,
wherein said first transfer device is comprised of:
a support shaft which is disposed vertically, is moved up and down and rotated, and is moved reciprocally along a transfer direction of the spout attachment bag, and
a suction member which is provided at a lower end of said support shaft with a suction face thereof facing down, and
wherein a rotational axis of said support shaft is provided so as to be in said reference plane even during a reciprocal motion thereof, and said support shaft suction-holds, using said suction member, the spout attachment bag positioned in a horizontal orientation, lifts said bag upward, and then transfers the bag keeping the bag in a horizontal orientation, and then rotates the bag during the transfer, thus positioning a perpendicular line passing through the center of the spout attachment opening of the spout attachment bag in the reference plane.

4. The apparatus for supplying spout attachment bags according to claim 2,
wherein said first transfer device is comprised of:
a support shaft which is disposed vertically, is moved up and down and rotated, and is moved reciprocally along a transfer direction of the spout attachment bag, and
a suction member which is provided at a lower end of said support shaft with a suction face thereof facing down, and
wherein a rotational axis of said support shaft is provided so as to be in said reference plane even during a reciprocal motion thereof, and said support shaft suction-holds, using said suction member, the spout attachment bag positioned in a horizontal orientation, lifts said bag upward, and then transfers the bag keeping the bag in a horizontal orientation, and then rotates the bag during the transfer, thus positioning a perpendicular line passing through the center of the spout attachment opening of the spout attachment bag in the reference plane.

* * * * *